Feb. 20, 1934.  C. E. SUMMERS  1,948,247
VIBRATION DAMPER
Filed March 25, 1931

Inventor
Caleb E. Summers
By Blackmore, Spencer & Hurt
Attorneys

Patented Feb. 20, 1934

1,948,247

UNITED STATES PATENT OFFICE 1,948,247

VIBRATION DAMPER

Caleb E. Summers, Pontiac, Mich., assignor to General Motors Corporation, Detroit, Mich., a corporation of Delaware Application March 25, 1931. Serial No. 525,118

9 Claims. (Cl. 74—6)

This invention relates to means for steadying the rotation of power transmitting shafts subjected to forces that tend to cause uneven rotation or torsional vibration. It appertains particularly to means for damping torsional vibrations in engine crankshafts having a flywheel at one extremity.

It is well known that unevenly rotating shafts and shafts of elastic material subject to torsional vibrations, such as the crankshafts of high speed internal combustion engines, may be made to rotate more evenly and with greater freedom from torsional oscillations by coupling frictionally thereto an inertia mass, such as a flywheel, which, by reason of its inertia tends to rotate at even speed and therefore applies a frictional braking effect to the shaft when the latter is rotating unevenly, thus reducing the amplitude of the oscillations of the latter with respect to the inertia mass.

Frictional dampers of this type require to be adjusted so that the frictional braking effect of the rotary mass is effective to damp oscillations of a particular amplitude. If the damper is adjusted to diminish vibrations of one amplitude it is likely to be less effective or totally inadequate to diminish oscillations of a different amplitude.

The crankshafts of modern automobile engines, as is well known, have several so-called periods at which undamped or unbalanced torsional vibrations become disagreeably sensible. These periods recur at different engine speeds. They are most violent and of greatest amplitude when the periodic thrusts of one or more pistons synchronize in frequency with the natural frequency of the shaft. A damper should be adjusted to apply greater braking effect to the crankshaft when the engine has reached the high speed period at which the amplitudes are widest and the vibrations of greater violence than at a lower speed period where the amplitudes are smaller and the vibrations less violent. If the damper is adjusted so that it will slip enough to efficiently brake the vibrating shaft at the high speed, wide amplitude period, it may not slip at all and thus augment the vibrations or slip too little to have an appreciable braking effect at a period of lower and more usual speed. The reverse is also true.

As frictional resistance varies with the pressure exerted to hold frictionally engaging surfaces in contact it has been hitherto proposed to vary this pressure in frictional dampers applied to engine crankshafts by centrifugal forces developed in response to crankshaft speed.

An object of this invention is to adjust the degree of frictional braking exerted by a torsional vibration damper of the type referred to in response to variations of load upon the crankshaft, as, for example, the load imposed by various crankshaft-driven engine accessories, the resistance of which increases with their speed.

Other objects are to simplify construction, reduce costs, and improve efficiency of torsional vibration dampers by means hereinafter disclosed specifically, a particular embodiment of which is illustrated in the accompanying drawing.

In the drawing in which like reference characters indicate like parts throughout the several views.

Figure 1:
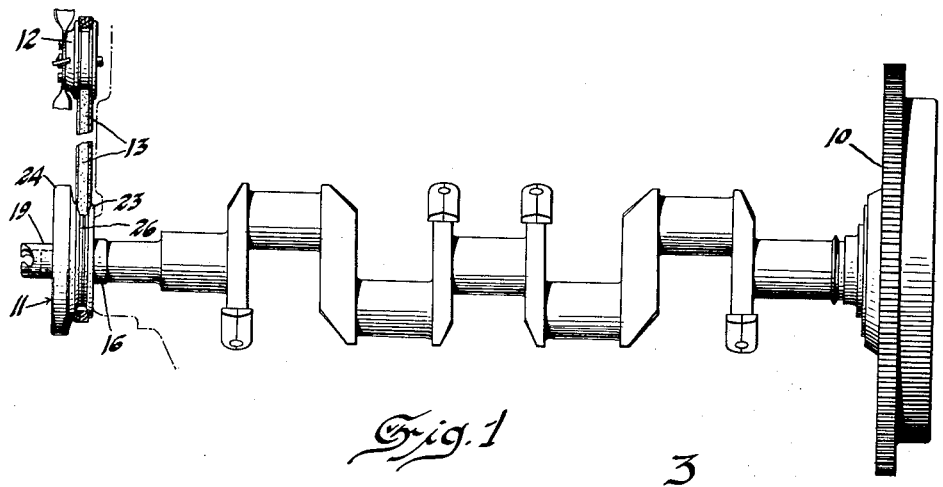
Fig. 1 is a side elevation of an engine crankshaft associated with this invention.

Figure 1 may be assumed to illustrate in side elevation any automobile engine crankshaft having attached at one end (the rear end) a relatively heavy flywheel 10 as is usual in automobile engines. Carried on the front end is a driving wheel combined with a vibration damper made in accordance with this invention. Said combined driving wheel and vibration damper is indicated as a whole by the numeral 11. Insofar as this combined device 11 operates as a driving wheel it may drive any of the usual accessories associated with an automobile engine as, for example, a cooling fan, an ignition timing device, a lighting and ignition generator, an oil or a water pump. In the illustrated embodiment this wheel is shown as a pulley driving a fan pulley 12 by means of a frictional driving connection such as a belt 13 passing around the driving wheel and the fan pulley.

Figure 2:
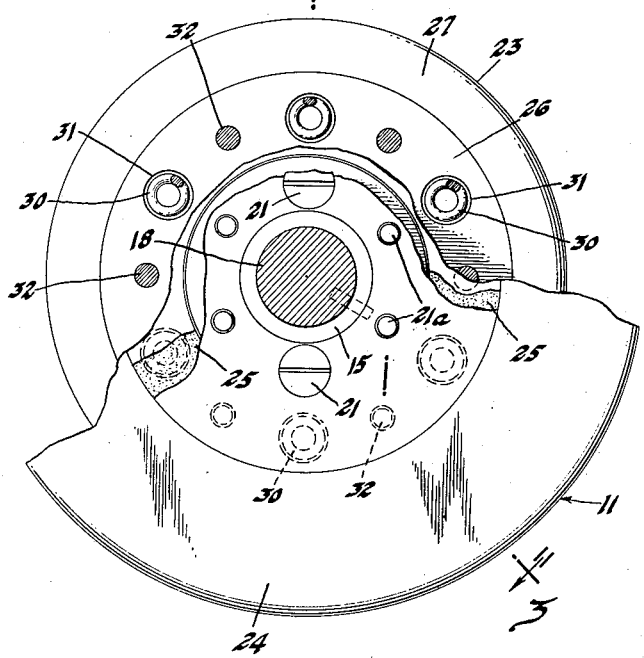
Fig. 2 is an end elevation viewed from the left of Fig. 1, showing a combined accessory-driving pulley and damper with parts broken away.
Figure 3:
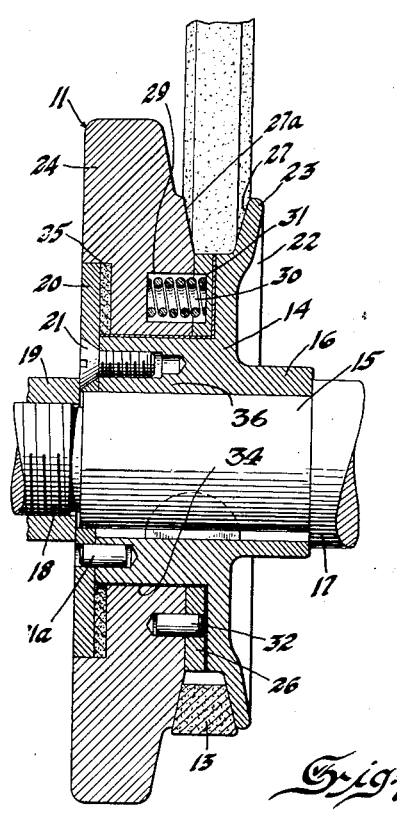
Fig. 3 is a section through said pulley and damper indicated by the line 3—3 in Fig. 2.

Said combined damper and driving wheel is shown in detail in Figures 2 and 3, in which numeral 14 indicates the positive driving member of the wheel (here shown as a pulley) which is keyed to the crankshaft. The member 14 is sleeved upon the reduced portion 15 of the crankshaft near the front end of the latter and is provided with a hub 16 which is seated axially against a shoulder formed on the shaft at 17. The extremity of the crankshaft is, as usual, further reduced and threaded as shown at 18 to receive the so-called starting nut 19 which bears against a flange plate 20 rigidly connected by screws 21, supplemented by dowels 21a, to said member 14. A flange 22 forming a part of the member 14 is provided with a flaring circumferential peripheral part 23, the inner face 27 of which is inclined in a radial plane including the axis of the shaft so as to diverge outward from a plane normal to the axis and intersecting the member at the inner circumference of said face 27. Between the flange 22 and the flange plate 20 is a circumferential groove the sides of which may be planes normal to the axis as shown and the bottom cylindrical external bearing surface 34 on the reduced body part 36 of driving member 14. In this groove is seated an annular inertia mass 24, a layer of frictional material 25 between said mass and the flange plate 20 and a bearing ring 26 between the mass and the adjacent face of the flange 22. The said mass is capable of rotation relative to the member 14 and, therefore, relative to the crankshaft, being restrained from said relative rotation only by the frictional engagement thereof with the bearing surfaces and the surface of the frictional layer 25 and by the belt 13.

That annular surface 27a of the mass 24 which is opposite the inclined annular surface 27 is inclined to a plane normal to the axis of the crankshaft to the same degree as is surface 27 of the member 14, but in the opposite direction. The surfaces 27 and 27a are designed to have frictional driving contact with a driving belt, the cross section of which is a geometrical figure with oppositely inclined sides,—preferably a trapezium, the non-parallel sides of which are inclined substantially the same as the inclinations of the sides 27 and 27a of the member 14 and the inertia mass 24 respectively. The driving belt 13 however, may be round or V-shaped in cross section or otherwise formed to wedge into the space between the described inclined faces 27 and 27a. A suitable form of belt is that shown in patent to C. R. Short #1,538,303 patented May 18, 1925, which has characteristics desirable to effectuate this invention.

The inertia mass 24 is provided in one face with a plurality of sockets 29, as shown in Figures 2 and 3, in each of which is seated a coiled spring 30, with one end protruding and seated in one of a plurality of corresponding sockets 31 provided in the bearing ring or washer 26. These springs are of the expansive type and tend to press the ring 26 against the inner face of the groove in the member 14 and equally to press the inertia mass 24 into contact with the layer 25 of frictional material whereby the more steadily moving inertia mass may resist by friction the alternate slowing and quickening speeds of a shaft rotating at uneven speed or alternately twisting and untwisting. The springs 30 move the bearing ring 26 rotatively in accordance with the rotary movements of the inertia mass 24. In addition to the springs, dowel pins 32 seated partly in cavities in the inertia mass 24 and partly in corresponding cavities in ring 26, also tie the mass 24 and the bearing ring 26 together rotatively while allowing such small relative axial movement as the construction provides for.

As the sides of the belt receiving groove bounded by the conical surfaces 27 and 27a on the driving member 14 and inertia mass 24 flare outward and the sides of the driving belt are disposed at the same or approximately equal angles any increase of loading placed upon the pulley and driving belt tends to cause the belt to be wedged radially inward in the groove. The lateral component of this wedging force is exerted upon the inclined surfaces 27 and 27a tending to separate the mass 24 from flange 22 fixed to the member 14 thereby pressing the member 24 into firmer contact with the frictional material 25 and increasing the frictional resistance of the mass 24 to relative rotation between the crankshaft and said mass. As the loading upon the driving belt increases with the increase of speed with which the accessory is driven, which of course, is in proportion to the speed of the crankshaft, the braking effect becomes greater because of the increased pressure with which the braking surfaces are pressed into contact. As the speed and load decrease the pressure is relieved and consequently the braking effect is decreased.

By the construction described the damper is automatically adjusted to vary the pressure between the braking surfaces in direct response to the increase of load placed upon the driving pulley by the accessories which are driven by it. As the load in the mechanism disclosed varies directly with the speed, it will be apprehended that a damper constructed in accordance with this invention will be automatically adjustable to dampen crankshaft vibrations at all of the critical periods thru which the crankshaft passes within the range of engine speed.

I claim:

1. A combination torsional vibration eliminator and means adapted to drive an auxiliary device, comprising a hub associated with means adapted to secure it rigidly to the end of an engine crankshaft; a rigid flange on said hub; an inertia member sleeved on said hub adjacent said flange; a yieldable driving connection between said inertia member and said hub, and opposed conoidal surfaces on said flange and inertia member adapted to be engaged by a driving band.

2. A rotary shaft subject to torsional oscillations in combination with means for damping oscillations thereof; said means comprising a driving member fixed to the shaft; an inertia damping member; means providing a frictional driving connection between the inertia member and the shaft; means engaging the driving and damping members for transmitting driving torque therefrom, and means responsive to variations of load on the means for transmitting driving torque for increasing the friction between the inertia member and the means providing frictional driving connection between said inertia member and the shaft.

3. A rotary shaft subject to torsional oscillations; a driving member fixed to said shaft; an inertia damping member; a frictional brake device disposed between the shaft and damping member whereby the damping member may be yieldably driven by the shaft; said driving member and damping member having opposed conoidal surfaces arranged to form an annular groove adapted to receive a frictional power transmitting element engaging the conoidal surface of both members for transmitting torque from the shaft.

4. A rotary shaft subject to torsional oscillations; a driving member secured to said shaft, said driving member comprising a flange having a conoidal surface; an inertia damping member coaxial with the driving member, mounted to be capable of free angular movement except as restrained by friction, and a limited axial movement; said damping member having a conoidal surface opposed to the conoidal surface of the driving member and a separate friction surface; said opposed conoidal surfaces constituting a groove adapted to receive a frictional power transmitting element in engagement with the conoidal surfaces of both members; and a friction element rigid with the shaft arranged to coact with the friction surface on the damping member with increasing friction as the damping member is moved axially away from said flange on the driving member.

5. A rotary shaft subject to torsional vibrations; a driving member secured to one end thereof, said member having a flange provided with a peripheral conoidal surface, a surface substantially normal to the axis of the shaft and disposed radially inward with respect to the conoidal surface, a second flange provided with a friction surface spaced from said first named flange, and an external bearing surface between said flanges; an inertia member journaled on said external bearing surface between the flanges; said inertia member having a conoidal surface opposed and oppositely inclined to the conoidal surface on the flange of the driving member and a surface arranged to bear against the friction surface of said second flange, and frictional power transmitting means engaging said conoidal surfaces of flange and inertia member.

6. A combination as defined in claim 5 with the addition of elastic means urging the inertia member into contact with the friction surface on said second flange.

7. A combination as defined in claim 5 with the addition of a bearing ring disposed between the inertia member and the flange having a conoidal surface, and elastic means exerting pressure between the bearing ring and the inertia member.

8. A combination as defined in claim 5 with the addition of a bearing ring between the inertia member and the flange having a conoidal surface, said bearing ring having cavities in the face adjacent the inertia member, and said inertia member having cavities registering with those in the ring, and means, including springs, seated in said cavities to compel the ring to rotate in unison with the inertia member.

9. The combination of a rotary shaft subject to torsional vibrations; a driving member secured to one end thereof; said member comprising a flange having a conoidal surface, a detachable flange spaced from said first-named flange, and a cylindrical bearing surface between said flanges; an inertia member journaled on said cylindrical bearing surface between said flanges, said inertia member having a conoidal surface opposed and oppositely inclined to the conoidal surface on the first-named flange of the driving member, a layer of friction material disposed between the inertia member and the detachable flange; a washer disposed between the inertia member and the flange having the conoidal surface, said washer and inertia member having registering spring sockets, and springs seated in said sockets for exerting their elastic force to press the inertia member into engagement with said layer of friction material.

CALEB E. SUMMERS.